United States Patent [19]
Hoffman

[11] 3,748,555
[45] July 24, 1973

[54] PROTECTIVE CIRCUIT FOR BRUSHLESS SYNCHRONOUS MOTORS

[75] Inventor: Arthur H. Hoffman, Monroeville, Pa.

[73] Assignee: Westinghouse Electric Corporation, Pittsburgh, Pa.

[22] Filed: May 1, 1972

[21] Appl. No.: 248,915

[52] U.S. Cl. .............................. 318/181, 318/193
[51] Int. Cl. ........................................... H02p 5/28
[58] Field of Search .......................... 318/193, 181

[56] References Cited
UNITED STATES PATENTS

| | | |
|---|---|---|
| 3,293,518 | 12/1966 | Neumann ..................... 318/193 X |
| 3,100,279 | 8/1963 | Rohner ............................. 318/167 |
| 3,582,736 | 6/1971 | Geib, Jr. ......................... 318/193 X |
| 3,381,195 | 4/1968 | Hoffman ......................... 318/193 X |

Primary Examiner—B. Dobeck
Attorney—A. T. Stratton et al.

[57] ABSTRACT

A protective circuit for brushless synchronous motors for protection against failure of a thyristor which controls the direct current excitation of the motor field winding. The circuit consists of a solid-state switch connected to shunt the rectifier which supplies the direct current excitation in response to failure of the thyristor.

3 Claims, 1 Drawing Figure

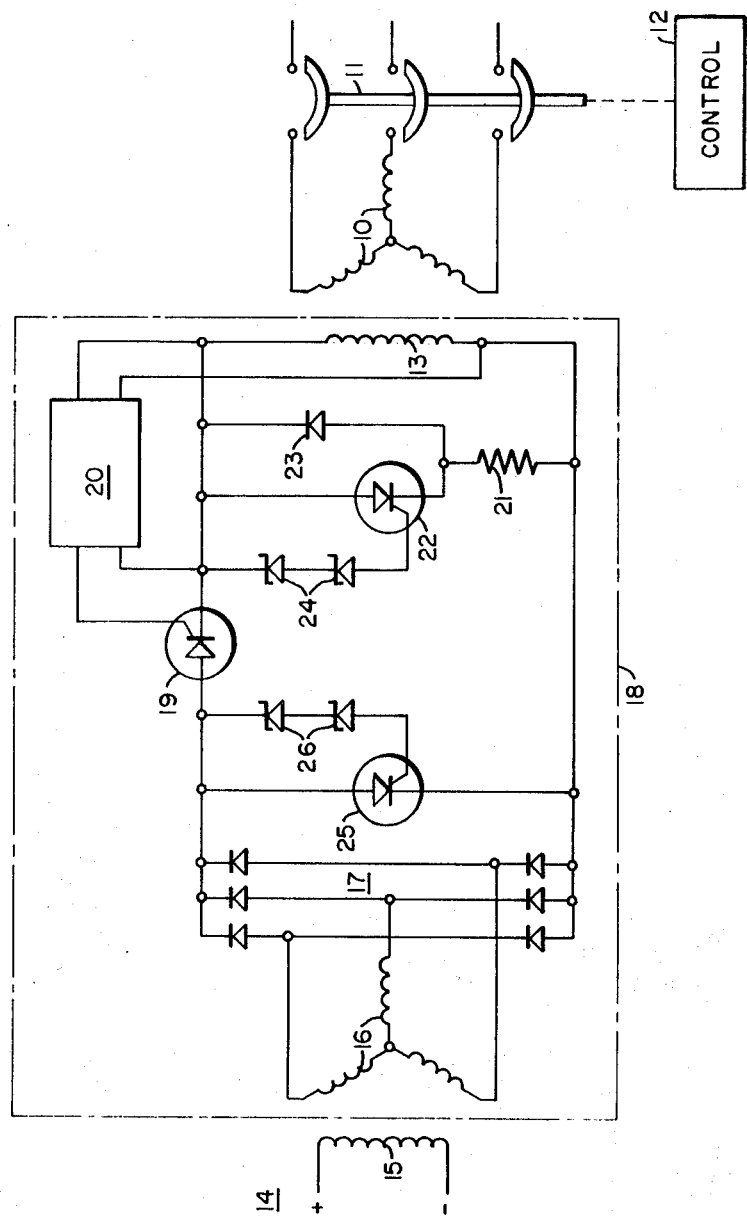

3,748,555

PROTECTIVE CIRCUIT FOR BRUSHLESS SYNCHRONOUS MOTORS

BACKGROUND OF THE INVENTION

The present invention relates to brushless synchronous motors, and more particularly to a protective circuit for protection against failure of a thyristor used as a switch to control the direct current excitation of the motor field winding.

In a brushless synchronous motor, direct current excitation for the field winding is provided by an alternating current exciter having a rotating armature winding connected to a rectifier assembly which rotates with the exciter to supply the required direct current excitation to the motor field winding. Such a motor is normally started as an induction motor and the field winding is not excited during the starting period when the motor is operating at subsynchronous speed, a discharge resistor usually being connected across the field winding. When the motor has accelerated to a speed sufficiently close to synchronism, direct current excitation is applied to the field winding at the proper time, the discharge resistor being disconnected, and the motor pulls into synchronism and runs normally. In a brushless motor, the switching and control operations are necessarily performed on the rotor, and solid-state switches and control components are used. In particular, an exciter switch must be connected between the rectifier and the field winding to interrupt the excitation circuit during starting so as to prevent flow of exciting current to the field winding and to prevent the rectifiers from shunting the discharge resistor. A thyristor is preferably used for this purpose. This thyristor must be in the non-conductive or blocking state during the starting period, as indicated above, and is fired to complete the circuit and apply field excitation at the proper time when the motor is capable of pulling into synchronism.

Solid-state switches such as thyristors are highly reliable devices but, as with any type of equipment, some possibility of failure exists. The most likely type of failure causes shorting of the thyristor so that it conducts continuously in both directions. Such a failure could result from overcurrent or overvoltage beyond the rating of the device, for example. If such a failure should occur during synchronous operation of the motor, no harm would result since the thyristor is normally conductive and the motor would continue to run in its normal manner. If the motor is stopped, however, and then restarted with the thyristor shorted direct current excitation from the rectifier would be applied to the field winding throughout the starting period. This direct current flowing in the motor field winding during subsynchronous operation can produce a large pulsating torque on the motor shaft, and the pulsation frequency of this torque varies with the slip of the motor which decreases as the motor accelerates. The pulsation frequency will very probably pass through torsional resonance frequencies during acceleration which would cause excessive build-up of the pulsating torque sufficient in many cases to damage the motor or exciter shafts or the driven equipment, or to damage gear teeth if the motor is used with a gear drive. While such failure and the resulting possibility of damage are relatively rare, the damage that can be caused by a shorted thyristor can be quite severe and protection against this possibility is a highly desirable feature for a brushless synchronous motor.

Furthermore, with a shorted thyristor exciter switch, the induced alternating current in the field winding at subsynchronous speeds is shunted by the rectifier instead of flowing in the resistor, thus reducing the induction motor torque which is necessary to accelerate the motor.

SUMMARY OF THE INVENTION

In accordance with the present invention, protection against a shorted thyristor used as an excitation switch in a brushless synchronous motor is provided by shunting the output of the rectifier in response to the occurrence of a short-circuited thyristor. This will prevent the motor from synchronizing and the timing or sequence relay normally used as part of the starting control will trip the motor from the line after a predetermined time. In the preferred embodiment of the invention, a solid-state shunting switch such as a thyristor is connected across the rectifier which supplies the direct current excitation and is gated by the voltage on the rectifier side of the thyristor excitation switch which is connected between the rectifier and field winding to control the direct current excitation. If the thyristor is operating normally, the voltage on the rectifier side is insufficient to gate the shunting thyristor and it has no effect on the operation of the motor. If the thyristor exciter switch becomes shorted, however, the voltage induced in the field winding during starting appears on the rectifier side of the shorted thyristor and fires the shunting thyristor to shunt the output of the rectifier and thus prevent the motor from synchronizing. The normal control will then trip the motor from the line as stated above.

BRIEF DESCRIPTION OF THE DRAWING

The invention will be more fully understood from the following detailed description, taken in connection with the accompanying drawing, the single FIGURE of which is a schematic diagram showing an illustrative embodiment of the invention.

DESCRIPTION OF PREFERRED EMBODIMENT

The invention is shown in the drawing embodied in a synchronous motor of any suitable construction having a stator winding 10, shown as a three-phase winding, connected to a supply line by a circuit breaker or contactor 11. The breaker 11 may be controlled by a control device 12 of any suitable type which preferably includes the usual motor starting control including a power factor relay and sequence timer of the usual kind. The motor has a field winding 13 which is preferably placed on salient poles on the rotor of the motor in the usual manner, the motor also being provided with a damper winding for starting by induction motor action. Field excitation for the motor is provided by an exciter 14 which has a field winding 15 carried on its stator member and excited with direct current from any suitable source. The exciter 14 also has an armature winding 16, shown as a three-phase winding, which is carried on the rotor and is rotatable with the rotor of the main synchronous motor. The armature winding 16 is connected to a rectifier means 17, shown as a three-phase rectifier bridge, to provide a direct current output for exciting the motor field winding 13. The exciter armature winding 16, the rectifier 17 and the field winding 13 are all carried on the same shaft, or are otherwise rotatable together on a common rotating member indicated at 18.

The rectifier 17 provides a direct current output which is utilized to excite the field winding 13. During starting of the motor, however, when it is operating at sub-synchronous speed, the field winding 13 should not be excited and should not be shunted by the rectifier 17. An exciter switch means must therefore be provided. For this purpose a thyristor 19 is connected as shown between the rectifier output and the field winding 13 so as to interrupt the excitation current when the thyristor is in its non-conductive or blocking state. The thyristor 19 is fired to actuate it to the conductive state to excite the field winding at the proper time and phase angle when the motor has accelerated close to synchronism, and any suitable means for firing the thyristor 19 may be utilized. Since the switching and control operations must be carried out on the rotating member 18, it is preferred to use solid-state switching and control circuitry and any suitable control means 20 may be utilized, such as either of the excitation controls shown in Frola Pat. No. 3,405,338 or Hoffmann et al. Pat. No. 3,414,788. The control circuit 20 as shown in either of those patents responds to the frequency of the induced voltage in the field winding 13 and is therefore preferably connected across the field winding as shown.

During starting of the motor a discharge resistor is preferably connected across the field winding. The discharge resistor 21 is carried on the rotating member 18 and controlled by a thyristor 22 and an oppositely poled diode 23. The gate electrode of the thyristor 22 is connected through a Zener diode or diodes 24 to respond to the voltage of the field winding 13.

In accordance with the present invention, a protective circuit is provided, in addition to the known circuitry described above, for protection against failure of the thyristor 19. The protective circuit as shown in the drawing consists of a solid-state switch, preferably a thyristor 25, which is connected across the output of the rectifier 17. The gate electrode of the thyristor 25 is connected through Zener diodes 26 to the rectifier side of the thyristor 19 so as to respond to the voltage at that point.

The operation of the complete motor circuit is as follows. In normal operation, when it is desired to start the motor, the motor stator winding 10 is energized by closing the breaker 11 and the motor will start by induction motor action, the thyristor 19 being in its non-conductive or blocking state so that the motor field winding 13 is not excited. The exciter field winding 15 is of course also energized. A relatively high voltage of high slip frequency is induced in the field winding 13 during the starting period, with the motor running at subsynchronous speed, and this voltage is sufficient to gate or fire the thyristor 22 to connect the field discharge resistor 21 across the field winding, the diode 23 providing conduction on the alternate half-cycles of the field voltage. The motor accelerates until it approaches synchronous speed, the slip frequency correspondingly decreasing, and when the control 20 senses the proper point as indicated by the slip frequency and phase angle of the induced voltage across the winding 13, the thyristor 19 is fired and becomes conductive to apply direct current excitation to the field winding 13, so that the motor will pull into step and run as a synchronous motor. The induced voltage across the field winding 13 drops to essentially zero at this time, that is, as the motor reaches synchronism, so that the voltage across the winding 13 is only that of the rectifier 17 which is insufficient to fire the thyristor 22 so it remains non-conductive and disconnects the discharge resistor 21. The motor is then in its normal operating condition and will continue to run as a synchronous motor.

If the thyristor 19 which serves as an exciter switch should fail during normal operation due to an overvoltage or overcurrent, or for any other reason, so that it is shorted and is continuously conductive in either direction, no change in operation occurs and the motor will continue to run normally since direct current excitation is being supplied to field winding 13. When the motor is stopped, however, and then it is attempted to restart the motor, the shorted thyristor 19 will permit the rectifier output current to flow to the motor field winding during the subsynchronous starting period with the resultant pulsating torque and possibility of severe damage previously discussed.

The protective circuit comprising the thyristor 25 is provided for protection against this possibility. Under normal starting conditions when the thyristor 19 is non-conductive, the only voltage applied to the Zener diodes 26 is the rectifier output voltage which is insufficient to fire the thyristor 25 so that it remains non-conductive and has no effect. If the thyristor 19 is shorted, however, so as to be conductive in both directions during the starting period, then the induced voltage across the field winding 13 appears on the rectifier side of the shorted thyristor 19 and is applied to Zener diodes 26. This induced voltage is substantially higher than that of the rectifier 17, and the Zener diodes 26 may be selected to have the same firing voltage as the Zener diodes 24, so that the voltage across the field winding 13 will positively and reliably fire the thyristor 25 in case the thyristor 19 is shorted. When this occurs the thyristor 25 is made conductive and directly shunts the output of the rectifier 17 so that it is prevented from flowing to the rotor field winding 13 and the large pulsating torques previously discussed cannot occur. When this happens, the motor of course cannot pull into step and synchronize but will continue to run at a sub-synchronous speed until the sequence timer of the usual power factor relay in the control 12 trips the breaker 11 as a result of the failure of the motor to synchronize within the preset time. Any other desired means could of course be used to trip the breaker if the motor fails to synchronize. This tripping of the breaker indicates that a failure has occurred in the excitation circuitry and the devices on the rotor can then be checked and the failed thyristor replaced.

It should now be apparent that a relatively simple protective means has been provided for protection of a brushless synchronous motor against the effects of a failed thyristor in the field excitation circuit. A particular embodiment of the invention has been shown for the purpose of illustration and it will be understood that various modifications and other embodiments are possible and that the protective circuit disclosed can be used in connection with any desired type of control for the excitation circuit.

I claim as my invention:

1. In a synchronous motor having a rotating field winding, an alternating current exciter having an armature winding rotatable with said motor field winding, and rectifier means connected to said exciter armature winding and rotatable therewith for supplying direct current excitation to the motor field winding, a control system for the motor field winding including solid-state exciter switch means connected between said rectifier means and the motor field winding to control said direct current excitation, said switch means normally being non-conductive during operation of the motor at sub-synchronous speeds, a discharge resistor connected across the motor field winding, solid state means connected in series with said resistor for permitting current to flow in the resistor only in response to voltage induced in the field winding during sub-synchronous operation of the motor, said exciter switch means being connected in the field winding circuit between the rectifier means and the discharge resistor, and short-circuiting means connected across the output of the rectifier means between the exciter switch means and the rectifier means, said short-circuiting means being adapted to shunt the rectifier means in response to conduction of the exciter switch means during sub-synchronous operation of the motor.

2. The combination defined in claim 1 in which the short-circuiting means is made conductive in response to the voltage on the rectifier side of the exciter switch means exceeding a predetermined value.

3. The combination defined in claim 1 in which the short-circuiting means comprises solid-state switching means, and means for actuating the last-mentioned switching means to the conductive state upon the occurrence of a voltage substantially equal to said induced voltage on the rectifier side of the exciter switch means.

* * * * *